May 15, 1945.  P. J. GORDINEER ET AL  2,375,914
FLUID SYSTEM INTERCONNECTOR
Filed Aug. 31, 1943  2 Sheets-Sheet 1
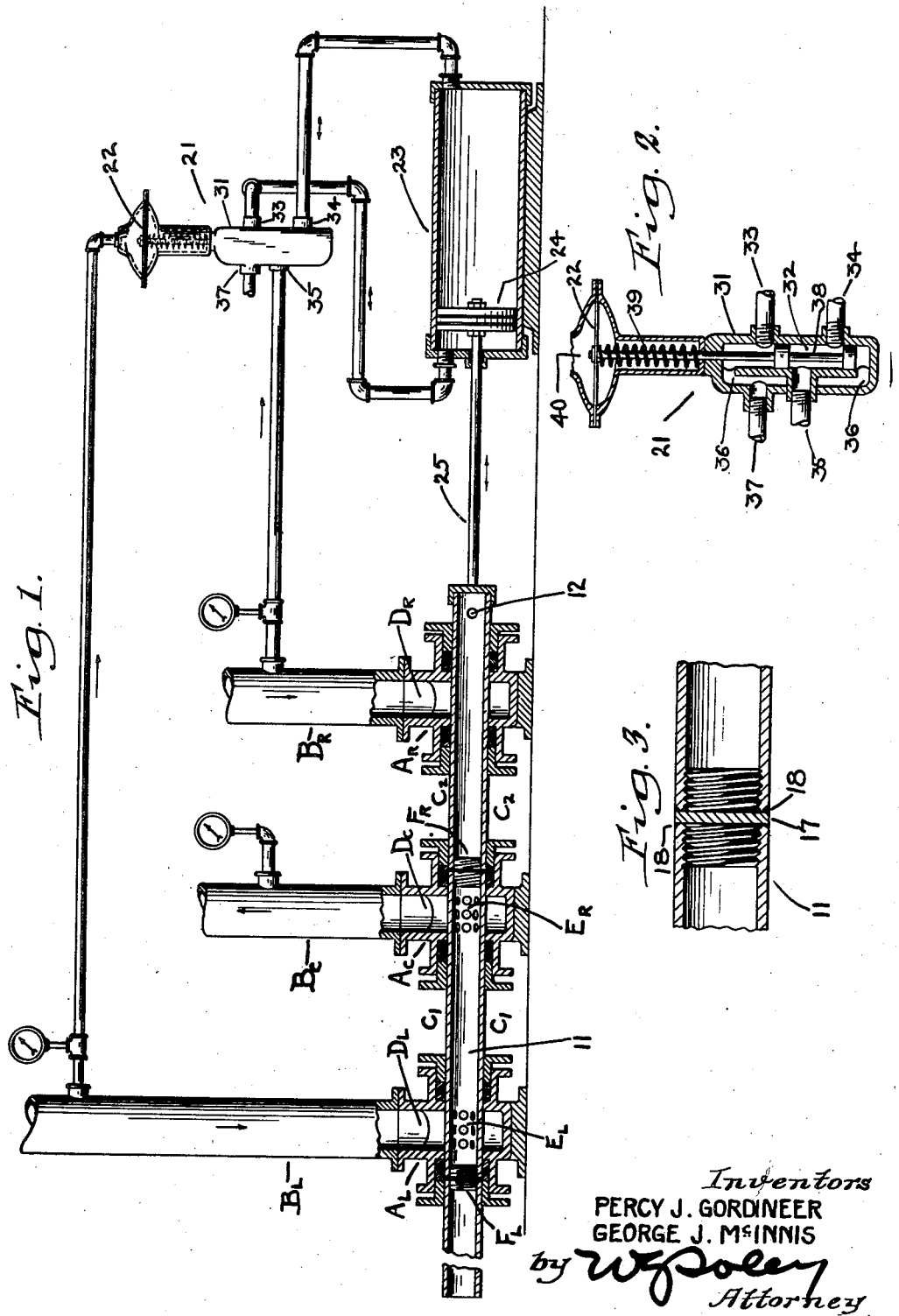
Inventors
PERCY J. GORDINEER
GEORGE J. McINNIS
by W. J. Foley
Attorney May 15, 1945.  P. J. GORDINEER ET AL  2,375,914
FLUID SYSTEM INTERCONNECTOR
Filed Aug. 31, 1943    2 Sheets-Sheet 2

INVENTOR.
PERCY J. GORDINEER
GEORGE J. McINNIS
BY

Patented May 15, 1945

2,375,914

UNITED STATES PATENT OFFICE 2,375,914

FLUID SYSTEM INTERCONNECTOR

Percy J. Gordineer and George J. McInnis,
Niagara Falls, N. Y.

Application August 31, 1943, Serial No. 500,670

5 Claims. (Cl. 137—78)

This invention relates to a fluid system interconnector and is a continuation in part of application Serial No. 444,790 filed May 28, 1942.

The invention provides a fluid system interconnector designed to supply fluid to a distributing main from two supply mains in such a manner that it is impossible for the fluid in one supply main to be connected in any manner so that it can contaminate the fluid in another supply main regardless of the variations in relative pressure of this fluid in the several supply mains.

The invention provides for the construction of an interconnector wherein the supply mains are connected to a plurality of valve bodies that are each arranged in spaced relation to a valve body connected to the distributing main and in which a valve means is slidable in all of the valve bodies and formed with a conduit system arranged to connect the distributing main with a selected supply main for conducting fluid therebetween while at the same time maintaining the valve bodies on the other supply main closed to the discharge of fluid. The valve construction further provides for draining the conduit in the valve member whenever the valve member is shifted from one position toward another and before the valve member can be shifted to subsequently reconnect a selected supply main with a distributing main.

The invention further contemplates the provision of means for actuating the valve member in accordance with the variation in pressure of the fluid in at least one of said supply mains so that one or another of said supply mains are connected to the distributing main whenever predetermined variations in pressure take place in one of said supply mains.

There are many industrial processes and systems that require interconnecting means of the character of the present invention, but, for the sake of simplicity, a water supply system will be used to illustrate the present invention.

A manufacturing plant that requires a constant supply of water in large volume usually is connected to two sources of supply; one being a river, lake, pond or well, from which water is pumped into the system with little or no treatment for purification, and the other being the municipal water system, which supplies purified water.

Usually, because of economy, the plant will utilize the raw river water (by which term is meant water from all other sources than the municipal system) at all times excepting when emergency conditions require that the municipal system be drawn upon and utilized. When such conditions arise it becomes necessary to make the changeover from the one source of supply to the other as quickly as possible. This requirement introduces the element of danger of contamination of the purified water of the municipal system by the introduction, through the opening or leaving open of the wrong valves, or leakage, of raw, or incompletely treated water into the pipe line of the municipal system.

The present invention is entirely free from the danger of contamination of the purified water by even minute quantities of raw or incompletely treated river water.

In the drawings,

Figure 1, partly in elevation and partly in section, shows one modification of interconnecting means according to the present invention;

Figure 2, in section, shows one type of valve for automatically controlling the operation of the interconnecting means comprised in this invention;

Figure 3, in section, shows in detail, one form of closure means shown in Figure 1.

Figure 4:
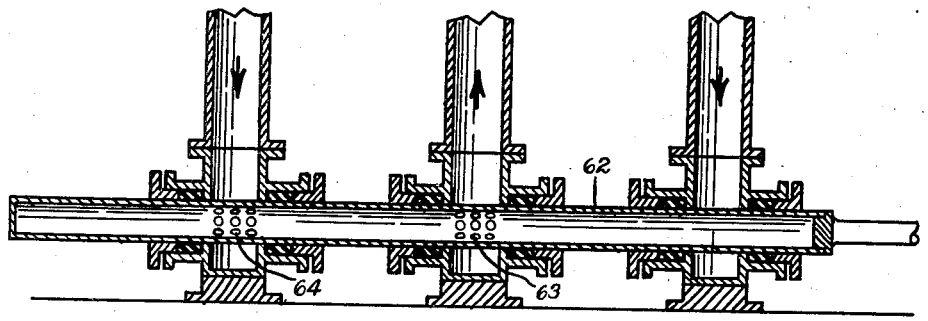
Figure 4 shows an interconnector similar to Figure 1 in cross-section from which the plugs have been omitted from the valve member and closures provided at the ends.

The combination illustrated in Figure 1 comprises three valve bodies, $A_L$, $A_C$ and $A_R$, each of which is connected to a pipe or conduit. Thus, one valve body $A_L$ is connected to the pipe $B_L$ that carries fluid from one source, e. g. raw water from a river; another of the valve bodies $A_C$ is connected to the pipe $B_C$ that delivers fluid, e. g. water to an industrial plant; and another of the valve bodies $A_R$ is connected to a pipe $B_R$ that carries fluid from a second source, e. g. water from a municipal water system.

The three valve bodies thus shown are entirely separate, one from the other, as far as the possibility of fluid from one source entering the pipe leading to the other source is concerned. Thus, the fluid carried by supply main $B_L$, shown at the left of the drawings cannot enter, under any circumstances, supply main $B_R$, shown at the right of the drawings.

While the valve bodies must be separated one from the other as described above they may be joined in any suitable manner to form a unit.

provided such joining does not provide a passageway for the fluid from one supply pipe or main to the other supply pipe. In other words, the space $C_1$ between the center valve body $A_C$ and the terminal valve body $A_L$ on the left, and the space $C_2$ between the center valve body $A_C$ and the terminal valve body $A_R$ on the right must be at atmospheric pressure at all times.

Each of the valve bodies $A_L$, $A_C$ and $A_R$ shown in Figure 1 encloses a fluid chamber $D_L$, $D_C$ and $D_R$, respectively, and the relative spacing of these chambers is important in the present invention, because the passage of fluid from the supply pipes $B_L$ and $B_R$ to the delivery pipe $B_C$ is controlled by a slidable tubular valve member 11 that provides interconnection of a supply main with the delivery main only by means of two groups $E_L$ and $E_R$ of perforations so spaced apart that one group registers with the chamber of the valve body in the delivery line and the other group registers with the chamber of the valve body in one of the supply lines, when the tubular valve member is at either end of its stroke. Thus, as shown in Figure 1, the slidable tubular valve member 11 has travelled to the left as far as it will go and has brought the one group of perforations $E_L$ into registry with the chamber $D_L$ and the other group of perforations $E_R$ into registry with the chamber $D_C$. The terminal valve body on the right must be so spaced from the center valve body that when the slidable tubular member 11 has moved from the extreme left to the extreme right the one group of perforations $E_L$ will register with the chamber $D_C$ of the valve body $A_C$ and the other group of perforations $E_R$ will register with the chamber $D_R$. In short, the valves may be said to be in equally spaced apart relationship.

As illustrated in Figure 1, the slidable tubular member 11 is provided with plugs $F_L$ and $F_R$ that completely close off the bore of the tube beyond that portion utilized in connecting the center valve body with one of the terminal valve bodies. This sealing of the tube at the points shown and described prevents accidental contamination of one fluid by the other, as might happen were the tube sealed at its extremities. One method of sealing the tube is shown in detail in Figure 3. As shown there, the tube 11 is cut in two and threaded internally at both the ends thus formed. A threaded plug 17 serves to rejoin the tube sections. Fluid-tightness of the joints 18 is obtained by means of soldering, brazing or welding, according to the kind of metal used.

The slidable tubular valve member 11, as shown in Figure 1, is of greater length than the distance between the farther away ends of the terminal valve bodies, and is open to the atmosphere at both ends; e. g. by the hole 12 at the right end of the tubular member. The length of the tubular member 11 preferably should be at least one and one-half times the distance between the farther away ends of the terminal valve bodies, exclusive of the packing nuts.

The device thus far described can be operated manually for connecting either one of two supply lines $B_L$ or $B_R$ with the delivery line $B_C$. As illustrated, the fluid carried by the line $B_L$ at the left would pass through the perforations $E_L$ at the left of the tube 11, thence through the tube and out of the perforations $E_R$ at the right of the tube 11 and out through the delivery pipe $A_C$.

If it were desired to conduct fluid from the other supply line $A_R$ to the delivery pipe instead of from the one shown to be in use, it would be necessary merely to pull or push the slidable tubular member 11 to the right until the perforations of the tube registered with the center and right valve chambers $D_C$ and $D_R$, respectively.

It will be noted from the drawings that both sets of perforations in the tube 11 will come into open space as the tube is moved from left to right as described above. In so doing they will permit any fluid left in the tube to leave the tube before the new connection or registry is effected. If, perchance, the movement from one registry to the other is so rapid as not to permit complete evacuation of the tube before the new registry is effected, there still would be no contamination of the fluid in the newly connected line because that fluid would be under pressure and would force the residual fluid in the tube into the delivery line. Further, the speed of the movement of the tubular member can be controlled to absolutely prevent such a situation.

It will be noted that the valve member of the interconnector has the fluid conducting conduit therein formed between plugs $F_L$ and $F_R$ with the ends of this conduit section of the valve member formed to provide an open-ended conduit at $E_L$ and $E_R$ for conducting fluid through the valve member across the space between adjacent valve bodies when the valve member is positioned to conduct fluid between either supply main and the delivery main. In either position of the valve for conducting fluid from a supply main to the delivery main it will also be noted that an imperforate portion of the valve member causes the other valve member on the unused supply main to prevent any discharge of fluid from the valve body connected thereto. By having the valve bodies spaced apart as illustrated in the drawings any leakage from the valve body of a supply main that is not provided with a connection by the conduit section of the valve member with the distributing main is prevented from contaminating the fluid in any other supply main or being contaminated thereby due to the spaced relation of the valve bodies from each other which will provide for discharge of seepage and the like externally of the valve body into the atmosphere.

Inasmuch as an interconnector of the character described above would give maximum service if it were automatically controlled and operated, one modification of such means is illustrated in the drawings.

Again referring to Figure 1, the combination shown comprises means for controlling and operating the interconnecting means hydraulically or pneumatically. This controlling and operating means comprises a four-way valve 21, whose diaphragm 22 is controlled by the pressure of the fluid in the pipe $B_L$ at the left of the drawings, and a ram 23 whose piston 24 is connected to the slidable tubular valve member 11 of the interconnector by means of piston rod 25. Actuation of ram 23 is effected by the pressure of the fluid in pipe $B_R$ at the right of the interconnector.

Figure 2 shows the four-way valve 21 in more detail. It comprises a cored body 31 having an inner cylinder 32 with two pressure outlets 33 and 34, one pressure inlet 35, and an outer chamber 36 opening into said inner chamber and having an exhaust port 37 to atmosphere. Slidable within the inner cylinder 32 is a double-disk piston 38 operable by virtue of the pressure exerted by the spring 39 connected to the diaphragm 22 when the pressure of the fluid in the chamber 40 drops below a certain predetermined value.

Referring now to Figure 1, and having recourse to the further details shown in Figure 2, the interconnector operates in the following manner. For clarity of explanation it is assumed that the combination is being used in an industrial water supply system with two sources of water supply, namely, river water through the left hand pipe $B_L$ and municipal water through the right hand pipe $B_R$.

According to the illustration, the pressure of the river water in the pipe $B_L$ is above the predetermined minimum, hence the spring pressure on the diaphragm 22 is offset and the double-disk piston is maintained in the position shown in Figure 2. As a consequence of this, municipal water is permitted to fill the right side of the ram cylinder 23 and the slidable tubular member 11 of the interconnector is kept in the position shown. River water therefore is being delivered to the plant through the center distributing pipe $B_C$.

If, for any reason, the pressure of the river water drops below a certain predetermined minimum the pressure of the spring 39 against the diaphragm no longer will be offset and it therefore will cause the double-disk piston 38 to move upward. Then, instead of municipal water being supplied to the right side of the ram it will be supplied to the left side and the piston 24 of the ram will be caused to move to the right and draw the tubular member 11 of the interconnector into the position whereby it will connect the municipal supply line $B_R$ with the delivery pipe $B_C$. As the tubular member 11 passes from the one position to the other the perforated sections will come into the open and permit the river water to drain out of the conduit section of said valve member before the new connection is made.

When the pressure of the river water in supply pipe $B_L$ again exceeds the predetermined minimum, the double-disk piston 38 of the four-way valve will be forced down again and the interconnector will be restored to the position shown in the drawings by virtue of the flow of municipal water into the right side of the ram 23.

Figure 4 shows an interconnector having the valve bodies arranged in the same manner as shown and described hereinabove in connection with Figure 1. The valve member 62 slidably mounted in the three spaced valve bodies, is provided with two sets of perforations 63 and 64 forming an open-ended conduit section of the valve member for providing communication with a pair of conduits connected to two of the valve bodies in the same manner as described above in connection with Figure 1. Valve member 62 is slightly different in construction from the valve member shown in Figure 1 in that it is not provided with plugs intermediate the ends but is closed at opposite ends to prevent passage of fluid from the interior conduit formed by the tubular shape of the valve member except through openings 63 and 64.

Figure 5:
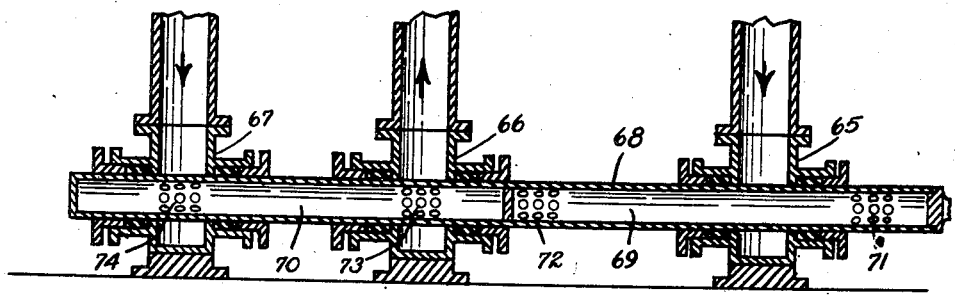
Figure 5 is a cross-section of an interconnector similar to that of Figures 1 and 4 showing how the valve bodies and valve member may be constructed and arranged with the valve bodies unequally spaced.

The modification shown in Figure 5 illustrates how the valve bodies in a construction similar to Figures 1 and 4 may be arranged in unequally spaced relation and fluid flow between selected valve bodies still be effectively controlled. Valve body 65 is spaced a greater distance from valve body 66 than valve body 67. Each of the valve bodies are formed with fluid chambers having communication with suitable supply and distributing mains connected one to each valve body in any desired manner.

A valve member 68 is slidably mounted in and extends through all three valve bodies in the same manner as in Figures 1 and 4. Valve member 68 however is formed to provide a pair of independent conduit sections 69 and 70 so formed that no fluid passage can take place between the conduit sections. Outlet openings 71 and 72 are provided at opposite ends of conduit section 69. They are spaced apart a distance equal to the spacing between valve bodies 65 and 66 in order that when valve member 68 is slidably moved from the position shown in Figure 5 to the left into another position, outlets 71 and 72 can be brought into registry with the fluid chambers in valve bodies 65 and 66 for the transmission of fluid therebetween.

Conduit section 70 is provided with spaced openings 73 and 74 having a distance between them that is less than that between outlets 71 and 72 and equal to the spacing between the fluid chambers in valve bodies 66 and 67. In this way openings 73 and 74 will provide communication through conduit section 70 between valve bodies 66 and 67 when valve member 68 is in the position shown in Figure 5. In this position it will be seen that the outlets for conduit section 69 are open to the atmosphere for draining of fluid therefrom and the passage through valve body 65 is effectively closed against any passage of fluid therefrom to either of the other valve bodies or mains due to the spaced relation between the several valve bodies. In this way, contamination of fluid from one main with that of another is effectively prevented as any seepage or leakage in any of the valves will be discharged to the atmosphere while valve member 68 may be shifted back and forth between two positions for selectively controlling and connecting one of the other of valve bodies 65 and 67 through one of the conduit sections for fluid flow between valve body 66 and one of the other valve bodies in accordance with the position of valve member 68.

The invention claimed is:

1. The combination comprising three valve bodies in equally spaced apart relationship, each of said valve bodies having an interior chamber, a tubular member slidable within all of said valve bodies, said tubular member being at least one and one-half times as long as the distance between the farther away ends of the terminal valve bodies and completely sealed interiorly at two points and perforated at two areas between said sealed points, the said perforated areas being spaced apart the same distance as that between the center lines of the chambers of two adjacent valve bodies and being located in said tubular member so that the length of the tubular member between each of said perforated areas and the respective adjacent end of said tubular member is greater than the distance between the center lines of the chambers of adjacent valve bodies, and means for sliding said tubular member within said valve bodies.

2. The combination comprising three valve bodies in equally spaced apart relationship, each of said valve bodies having an interior chamber, a tubular member slidable within all of said valve bodies, said tubular member being at least one and one-half times as long as the distance between the farther away ends of said valve bodies and completely sealed interiorly at two points and perforated at two areas between said sealed points, the said perforated areas being spaced apart the same distance as that between the center lines of the chambers of two adjacent valve bodies and being located in said tubular member so that the length of the tubular member beween each of said perforated areas and the respective adjacent end of said tubular member is greater than the distance between the center lines of the chambers of adjacent valve bodies.

3. A fluid supply system, comprising a fluid receiving and distributing main, a primary supply main for supplying fluid to said distributing main, a secondary supply main for supplying fluid to said distributing main and an interconnector for selectively controlling supply of fluid from either of said supply mains to said distributing main in a manner to prevent the passage of undelivered fluid from one of said supply mains from being received in the other main, said interconnector comprising a plurality of valve bodies each formed with fluid chambers connected with one of said mains, said valve bodies connected with said supply mains being mounted in spaced relation to a valve body connected to said distributing main, and valve means formed with a longitudinally extending conduit section intermediate the ends of said valve means having openings at the opposite ends of said section, said valve means being slidably mounted in, extending through and bridging the space between each of the adjacent valve bodies, said valve means cooperating with said valve bodies in sliding movement between two positions to move the open ends of said conduit section into registry with the fluid chambers of one of said supply mains and said distributing main in each position for conducting fluid from one of said supply mains to said distributing main while maintaining the other supply main closed, the spaced relation between the valve bodies preventing any possible passage of fluid from the last-mentioned valve body to any other.

4. A fluid supply system, comprising a fluid receiving and distributing main, a primary supply main for supplying fluid to said distributing main, a secondary supply main for supplying fluid to said distributing main and an interconnector for selectively controlling supply of fluid from either of said supply mains to said distributing main in a manner to prevent the passage of undelivered fluid from one of said supply mains from being received in the other main, said interconnector comprising three valve bodies each formed with a fluid chamber, said bodies being mounted in spaced aligned relation, an intermediate valve body being connected to the distributing main with the fluid chamber communicating with said main, valve bodies beyond opposite ends of said intermediate valve body having connection with one of said supply mains with the chambers therein communicating with the connected supply main, and a valve member slidably mounted in and extending through and between all of said valve bodies, said valve member having an open-ended conduit section formed in an intermediate portion thereof arranged to establish a fluid conducting connection between the fluid chambers of either supply main and said distributing main according to the position of said valve member relative to said valve bodies, said valve member having a section beyond said conduit section closing the fluid chamber in the valve body not in registry with one of the open ends of said conduit section, and said valve member and the spaced relation of said valve bodies cooperating to position the open ends of said conduit section in communication with the atmosphere whenever said valve member is moved to cut off the supply connection between any one of the supply mains and the distributing main for draining said conduit section to prevent contamination of the fluid in one supply main with that in the other before a new fluid conducting connection is subsequently made with either supply main.

5. A fluid supply system comprising a fluid receiving and distributing main, a primary supply main for supplying fluid to said distributing main, a secondary supply main for supplying fluid to said distributing main, an interconnector for selectively controlling supply of fluid from either of said supply mains to said distributing main in a manner to prevent the passage of undelivered fluid from one of said supply mains from being received in the other supply main, said interconnector comprising a plurality of valve bodies each formed with fluid chambers connected to one of said mains, said valve bodies connected with said supply mains being mounted in spaced relation to a valve body connected to said distributing main, a tubular valve slidably engaged in and bridging the space between all of said valve bodies in all positions thereof for controlling fluid flow in all of said bodies, said valve having a longitudinally extending conduit section intermediate the ends thereof with openings formed at opposite ends of said section, said valve cooperating with said valve bodies in sliding movement between two positions to move the open ends of said conduit section into registry with the fluid chambers of one of said supply mains and said distributing main in each position for conducting fluid from one of said supply mains to said distributing main while maintaining the other supply main closed, a piston member, a cylinder member receiving said piston member for relative sliding movement, said piston and cylinder members having one member mounted on said valve and the other member mounted in fixed relation to said valve bodies, a pressure supply connection with said secondary supply main to said cylinder member for supplying fluid to opposite ends thereof for moving said piston member in both directions in and relative to said cylinder member, control valve means controlling said pressure supply connection operable between two positions for selectively connecting said secondary supply main with each end of said cylinder member, and pressure actuated means connected with said primary supply main for selectively moving said valve means into each of said positions actuated by variations in pressure in said primary supply main, whereby said tubular valve is moved into either of its two positions by the operation of said piston and cylinder members according to pressure variations in said primary supply main.

PERCY J. GORDINEER.
GEORGE J. McINNIS.